(12) United States Patent
Mills et al.

(10) Patent No.: US 11,567,322 B2
(45) Date of Patent: Jan. 31, 2023

(54) SYSTEMS, DEVICES, AND METHODS FOR EYEBOX EXPANSION IN WEARABLE HEADS-UP DISPLAYS

(71) Applicant: GOOGLE LLC, Mountain View, CA (US)

(72) Inventors: Jackie Lynn Mills, Kitchener (CA); Shreyas Potnis, Kitchener (CA); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 446 days.

(21) Appl. No.: 16/670,284

(22) Filed: Oct. 31, 2019

(65) Prior Publication Data

US 2020/0142196 A1    May 7, 2020

Related U.S. Application Data

(60) Provisional application No. 62/755,206, filed on Nov. 2, 2018.

(51) Int. Cl.
| | |
|---|---|
| *G02B 27/01* | (2006.01) |
| *G06F 3/01* | (2006.01) |
| *G03H 1/02* | (2006.01) |
| *F21V 8/00* | (2006.01) |
| *G06F 1/16* | (2006.01) |
| *G02B 27/00* | (2006.01) |

(52) U.S. Cl.
CPC ....... *G02B 27/0172* (2013.01); *G02B 6/0065* (2013.01); *G02B 27/0081* (2013.01); *G03H 1/02* (2013.01); *G06F 1/163* (2013.01); *G06F 3/013* (2013.01); *G02B 2027/0174* (2013.01); *G02B 2027/0178* (2013.01)

(58) Field of Classification Search
CPC ............ G02B 27/0172; G02B 27/0081; G02B 6/0065; G02B 2027/0174; G02B 2027/0178; G03H 1/02; G06F 1/163; G06F 3/013
USPC ........................................... 359/13
See application file for complete search history.

(56) References Cited

U.S. PATENT DOCUMENTS

| | | | |
|---|---|---|---|
| 9,535,253 B2* | 1/2017 | Levola ............... | G02B 27/0081 |
| 10,437,064 B2* | 10/2019 | Popovich ............. | G02B 6/0058 |
| 10,545,346 B2* | 1/2020 | Waldern ................ | G06F 3/0421 |
| 10,690,916 B2* | 6/2020 | Popovich ............. | G02B 6/0016 |
| 10,890,707 B2* | 1/2021 | Waldern ............. | G02B 26/0808 |
| 11,106,048 B2* | 8/2021 | Popovich ............. | G02F 1/3136 |
| 11,194,162 B2* | 12/2021 | Waldern ............. | G02B 27/0172 |
| 2014/0140654 A1* | 5/2014 | Brown ................. | G02B 5/1814 |
| | | | 385/10 |
| 2017/0115487 A1* | 4/2017 | Travis ................... | G03H 1/0256 |
| 2018/0011324 A1* | 1/2018 | Popovich ........... | G02B 27/0172 |
| 2018/0275402 A1* | 9/2018 | Popovich ............. | G02B 6/0065 |
| 2018/0284440 A1* | 10/2018 | Popovich ........... | G02B 27/0179 |

(Continued)

*Primary Examiner* — Collin X Beatty (57) ABSTRACT

Systems, devices, and methods for expanding the eyebox of a wearable heads-up display are described. A light guide with an expanded eyebox includes a light guide material, an in-coupler, an outcoupler, and a gradient refractive index (GRIN) material. The in-coupler and the out-coupler may comprise a GRIN material. An eyeglass lens with expanded eyebox includes a light guide with expanded eyebox. A wearable heads-up display includes an eyeglass lens including a light guide with an expanded eyebox.

19 Claims, 7 Drawing Sheets

(56) References Cited

U.S. PATENT DOCUMENTS

| | | | |
|---|---|---|---|
| 2019/0064735 A1* | 2/2019 | Waldern | G02B 27/0172 |
| 2019/0121027 A1* | 4/2019 | Popovich | G02B 6/34 |
| 2019/0285796 A1* | 9/2019 | Waldern | G02B 27/0172 |
| 2020/0026074 A1* | 1/2020 | Waldern | G02B 27/0101 |
| 2020/0241301 A1* | 7/2020 | Basset | G02B 5/1861 |

* cited by examiner

SYSTEMS, DEVICES, AND METHODS FOR EYEBOX EXPANSION IN WEARABLE HEADS-UP DISPLAYS

TECHNICAL FIELD

The present systems, devices, and methods generally relate to wearable heads-up displays and particularly relate to expanding the eyebox in light-guide based wearable heads-up displays.

BACKGROUND

Description of the Related Art

Wearable Heads-Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. The "combiner" component of a wearable heads-up display is the physical structure where display light and environmental light merge as one within the user's field of view. The combiner of a wearable heads-up display is typically transparent to environmental light but includes some optical routing mechanism to direct display light into the user's field of view.

Examples of wearable heads-up displays include: the Google Glass®, the Optinvent Ora®, the Epson Moverio®, and the Microsoft Hololens® just to name a few.

Light Guides in Wearable Heads-Up Displays

A majority of currently available wearable heads-up displays employ light guide systems in the transparent combiner. A light guide operates under the principle of total internal reflection (TIR). TIR occurs when light remains in a first medium upon incidence at a boundary with a second medium because the refractive index of the first medium is greater than the refractive index of the second medium and the angle of incidence of the light at the boundary is above a specific critical angle that is a function of those refractive indices. Light guides employed in wearable heads-up displays like those mentioned above typically consist of rectangular prisms of material with a higher refractive index than the surrounding medium, usually air (Google Glass®, Optinvent Ora®, Epson Moverio®) or a planar lens (Microsoft Hololens®). Light input into the prism will propagate along the length of the prism as long as the light continues to be incident at boundaries between the prism and the surrounding medium at an angle above the critical angle. Light guides employ in-coupling and out-coupling elements to ensure that light follows a specific path along the light guide and then exits the light guide at a specific location in order to create an image that is visible to the user.

The optical display performance of a wearable heads-up display is an important factor in its design. When it comes to face-worn devices, however, users also care significantly about aesthetics. This is clearly highlighted by the immensity of the eyeglasses (including sunglasses) frame industry. Independent of their performance limitations, many of the aforementioned examples of wearable heads-up displays have struggled to find traction in consumer markets because, at least in part, they lack fashion appeal. Most wearable heads-up displays presented to date employ planar light guides in planar transparent combiners and, as a result, appear very bulky and unnatural on a user's face compared to the more sleek and streamlined look of typical curved eyeglass and sunglass lenses. In addition, light guides employed in wearable heads-up displays may suffer from a variety of optical defects due to the integration of the light guide into the wearable heads-up display. These optical defects may include seams at the edges of the light guide, diffraction of environmental light by the light guide, or display light that is not properly guided into the eye of the user, all of which may be visible to either the user or an outside observer.

There is a need in the art to integrate light guides in wearable heads-up displays or eyewear in order to achieve the form factor and fashion appeal expected of the eyeglass and sunglass frame industry without introducing optical defects into the lenses of the wearable heads-up display.

BRIEF SUMMARY

A light guide with expanded eyebox may be summarized as including: light guide material; an in-coupler; an out-coupler; and a gradient refractive index (GRIN) layer disposed between the in-coupler and the light guide material, wherein the GRIN layer is also disposed between the out-coupler and the light guide material.

A light guide with expanded eyebox may be summarized as including: light guide material; a gradient refractive index (GRIN) in-coupler; and a gradient refractive index (GRIN) out-coupler.

A lens for use in a weareable heads-up display may be summarized as including: lens material; and a light guide comprising: light guide material; a gradient refractive index (GRIN) in-coupler; and a gradient refractive index (GRIN) out-coupler.

A wearable heads-up display (WHUD) with and expanded eyebox may be summarized as including: a support structure; a projector; and a transparent combiner positioned and oriented to appear in a field of view of an eye of a user when the support structure is worn on a head of the user, the transparent combiner comprising: a lens; and a light guide comprising: light guide material; a gradient refractive index (GRIN) in-coupler; and a gradient refractive index (GRIN) out-coupler.

A method for manufacturing a light guide with expanded eyebox may be summarized as including: physically coupling a layer of gradient refractive index (GRIN) material to a light guide; physically coupling an in-coupler to the layer of GRIN material; and physically coupling an out-coupler to the layer of GRIN material. Physically coupling a layer of GRIN material to a light guide may include physically coupling an inorganic layer of GRIN material to a light guide.

A method for manufacturing a light guide with expanded eyebox may be summarized as including: physically coupling an in-coupler to a light guide, the in-coupler comprising a layer of gradient refractive index (GRIN) material; and physically coupling an out-coupler to a light guide, the out-coupler comprising a layer of GRIN material. Physically coupling an in-coupler to a light guide may include physically coupling an in-coupler comprising photopolymer to a light guide; and physically coupling an out-coupler to a light guide may include physically coupling an out-coupler comprising photopolymer to a light guide. Physically coupling an in-coupler comprising photopolymer to a light guide may include physically coupling an in-coupler comprising at least one hologram to a light guide; and physically coupling an out-coupler comprising photopolymer to a light guide may include physically coupling an out-coupler comprising at least one hologram to a light guide.

A light guide may be summarized as including: a light guide material; a gradient refractive index (GRIN) material carried by the light guide material; an in-coupler; and an out-coupler. A first portion of the GRIN material may be disposed between the in-coupler and the light guide material and a second portion of the GRIN material may be disposed between the out-coupler and the light guide material. The GRIN material may include a single continuous layer of GRIN material carried by a surface of the light guide material.

The in-coupler may include an in-coupler hologram and the out-coupler may include an out-coupler hologram. The in-coupler may include an in-coupler surface relief grating and the out-coupler may include an out-coupler surface relief grating.

The GRIN material may include a GRIN photopolymer material. The in-coupler may include an in-coupler hologram recorded in a first portion of the GRIN material and the out-coupler may include an out-coupler hologram recorded in a second portion of the GRIN material. The light guide may further include an exit pupil expander hologram recorded in a third portion of the GRIN material, the third portion of the GRIN material positioned in between the first portion of the GRIN material and the second portion of the GRIN material on a surface of the light guide material.

A lens for use in a wearable heads-up display may be summarized as including: a lens material; and a light guide integrated with the lens material, the light guide comprising: a light guide material; a gradient refractive index (GRIN) material carried by the light guide material; an in-coupler; and an out-coupler. The light guide may be integrated inside the lens material.

A first portion of the GRIN material may be disposed between the in-coupler and the light guide material and a second portion of the GRIN material may be disposed between the out-coupler and the light guide material. The GRIN material may include a single continuous layer of GRIN material carried by a surface of the light guide material.

The GRIN material may include a GRIN photopolymer material, the in-coupler may include an in-coupler hologram recorded in a first portion of the GRIN material, and the out-coupler may include an out-coupler hologram recorded in a second portion of the GRIN material. The lens may further innlude an exit pupil expander hologram recorded in a third portion of the GRIN material, the third portion of the GRIN material positioned in between the first portion of the GRIN material and the second portion of the GRIN material on a surface of the light guide material.

A wearable heads-up display (WHUD) may be summarized as including: a support structure; a light engine carried by the support structure; and a transparent combiner positioned and oriented to appear in a field of view of an eye of a user when the support structure is worn on a head of the user, the transparent combiner comprising: a lens; and a light guide integrated with the lens, the light guide comprising: a light guide material; a gradient refractive index (GRIN) material carried by the light guide material; an in-coupler; and an out-coupler.

A first portion of the GRIN material may be disposed between the in-coupler and the light guide material and a second portion of the GRIN material may be disposed between the out-coupler and the light guide material. The GRIN material may include a single continuous layer of GRIN material carried by a surface of the light guide material.

The GRIN material may include a GRIN photopolymer material, the in-coupler may include an in-coupler hologram recorded in a first portion of the GRIN material, and the out-coupler may include an out-coupler hologram recorded in a second portion of the GRIN material. The WHUD may further include an exit pupil expander hologram recorded in a third portion of the GRIN material, the third portion of the GRIN material positioned in between the first portion of the GRIN material and the second portion of the GRIN material on a surface of the light guide material.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for expanding the eyebox of a wearable heads-up display and are particularly well-suited for use in wearable heads-up displays ("WHUDs").

The various embodiments described herein provide systems, devices, and methods for lenses with waveguides integrated therewith, for example curved lenses with planar waveguides, for instance curved eyeglass or eyewear prescription lenses. Lenses with waveguides embedded therewith are particularly well-suited for use as or in the transparent combiner of wearable heads-up displays ("WHUDs") in order to enable the WHUDs to adopt more aesthetically-pleasing styles and, in some implementations, to enable the WHUDs to include prescription lenses. Examples of WHUD systems, devices, and methods that are particularly well-suited for use in conjunction with the present systems, devices, and methods for curved lenses with waveguides (e.g., planar waveguides) are described in, for example, U.S. Non-Provisional patent application Ser. No. 15/167,458 (now U.S. Patent Application Publication No. US 2016-0349514 A1), U.S. Non-Provisional patent application Ser. No. 15/167,472 (now U.S. Patent Application Publication No. US 2016-0349515 A1), U.S. Non-Provisional patent application Ser. No. 15/167,484 (now U.S. Patent Application Publication No. US 2016-0349516 A1), U.S. Patent Application Publication No. US 2016-0377865 A1, U.S. Patent Application Publication No. US 2016-0377866 A1, and US Patent Application Publication No. US 2016-0238845 A1

A typical light guide comprises light guide material with a refractive index (RI) higher than its surroundings, an in-coupler to direct light into the light guide, and an out-coupler to direct light out of the light guide. Light guides may be employed as displays, in which case the out-coupler directs light out of the light guide into the eye of the user.

In order to enter the eye of the user, the light must pass through the pupil of the eye of the user. However, the pupil is small (typically less than 4 mm in diameter, and may be smaller than 1.4 mm in diameter in bright light conditions) and moves as the user looks at different areas of their environment or of the content being displayed by the light guide. It is therefore important that light guides employed in displays have a wide field of view (FOV), meaning that the light guide can out-couple light across a wide range of angles. The total area of the display that falls within the FOV of the display is referred to as the eyebox of the display. Increasing the FOV of the display therefore increases the eyebox of the display.

Many in-couplers/outcouplers induce chromatic dispersion to the light that is in-coupled/outcoupled into/out of the light guide. By using identical elements for the incoupler and the out-coupler, the chromatic dispersion caused by the in-coupler is equal in magnitude and opposite in sign to the chromatic dispersion caused by the out-coupler and there is no net chromatic dispersion visible to the user. Therefore, the range of angles that light may be out-coupled from the light guide is equal to the range of angles that light may be in-coupled into the light guide because it is advantageous to use identical elements for out-coupling and in-coupling to avoid chromatic dispersion within the light guide.

The range of angles that may be in-coupled to a light guide has a minimum and a maximum limit, as measured from the normal to the light guide. The minimum angle at which light may be coupled in to the light guide is the critical angle for total internal reflection (TIR), defined by the Fresnel equation for TIR. As a result, the minimum angle at which light may be coupled in to the light guide is controlled by the difference in refractive index between the light guide and its surrounding medium. Specifically, the greater the RI of the light guide relative to the surroundings of the light guide, the smaller the minimum angle and the greater the FOV of the display.

The maximum angle at which light may be coupled in to the light guide is determined by the bounce length of the coupled light within the light guide. A very steep input angle causes a very large bounce length of the coupled light within the light guide. The bounce length of the coupled light is equal to the distance between exit pupils that may be out-coupled from the light guide. If the bounce length exceeds the diameter of the pupil then there will be positions that the pupil could be located that are between exit pupils, making it impossible for the user to view the display.

Since the size of the pupil of the eye of the user cannot be changed during display design, the FOV of the display may only reasonably be increased by increasing the refractive index of the light guide. Mis-matches in refractive index between the light guide and its surroundings may cause optical defects within the light guide, therefore there is a need in the art for methods to expand the eyebox of a light guide-based wearable heads-up display by increasing the RI of the light guide while eliminating the optical defects caused by increasing the RI of the light guide.

Figure 1:
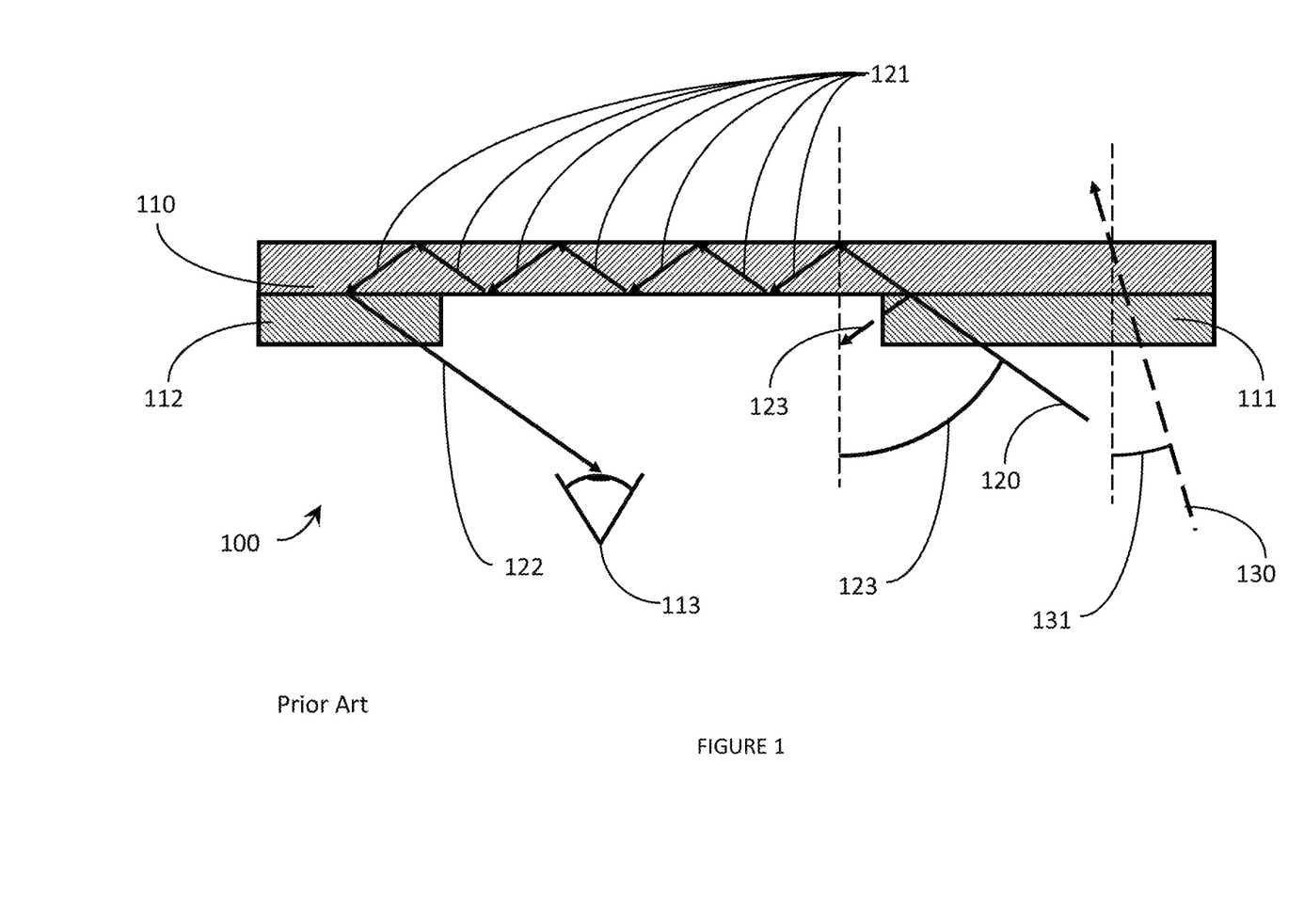
FIG. 1 is a cross-sectional view of a conventional light guide.

FIG. 1 is a cross-sectional view of conventional light guide 100. Conventional light guide 100 comprises light guide 110, in-coupler 111, and out-coupler 112. First beam of light 120 has a first in-coupler incident angle 123. First beam of light 120 is coupled into light guide 110 with an angle greater than the critical angle of light guide 110, and experiences total internal reflection (TIR) within light guide 110 to produce guided light 121. Guided light 121 propagates through light guide 110 until guided light 121 reaches out-coupler 112; out-coupler 112 redirects guided light 121 to form outcoupled light 122 which may be directed towards an eye of a user 113.

Second beam of light 130 has a second in-coupler incident angle 131. Second beam of light 130 is coupled into light guide 110 with an angle less than the critical angle of light guide 110. Second beam of light does not experience TIR, and passes through light guide 110 without experiencing TIR.

If the refractive index (RI) of in-coupler 111 is not equal to the RI of light guide 110, first beam of light 120 may experience a Fresnel reflection at the interface between in-coupler 111 and light guide 110 to produce reflected light 123. Reflected light 123 may be visible to the eye of the user 113; if first beam of light 120 comprises coherent light (e.g. laser light), then reflected light 123 may interfere with first beam of light 120, for example to form a Newton ring. Reflected light 123 therefore is an optical defect of light guide 100 and is disadvantageous if light guide 100 is employed in a wearable heads-up display.

Figure 2:
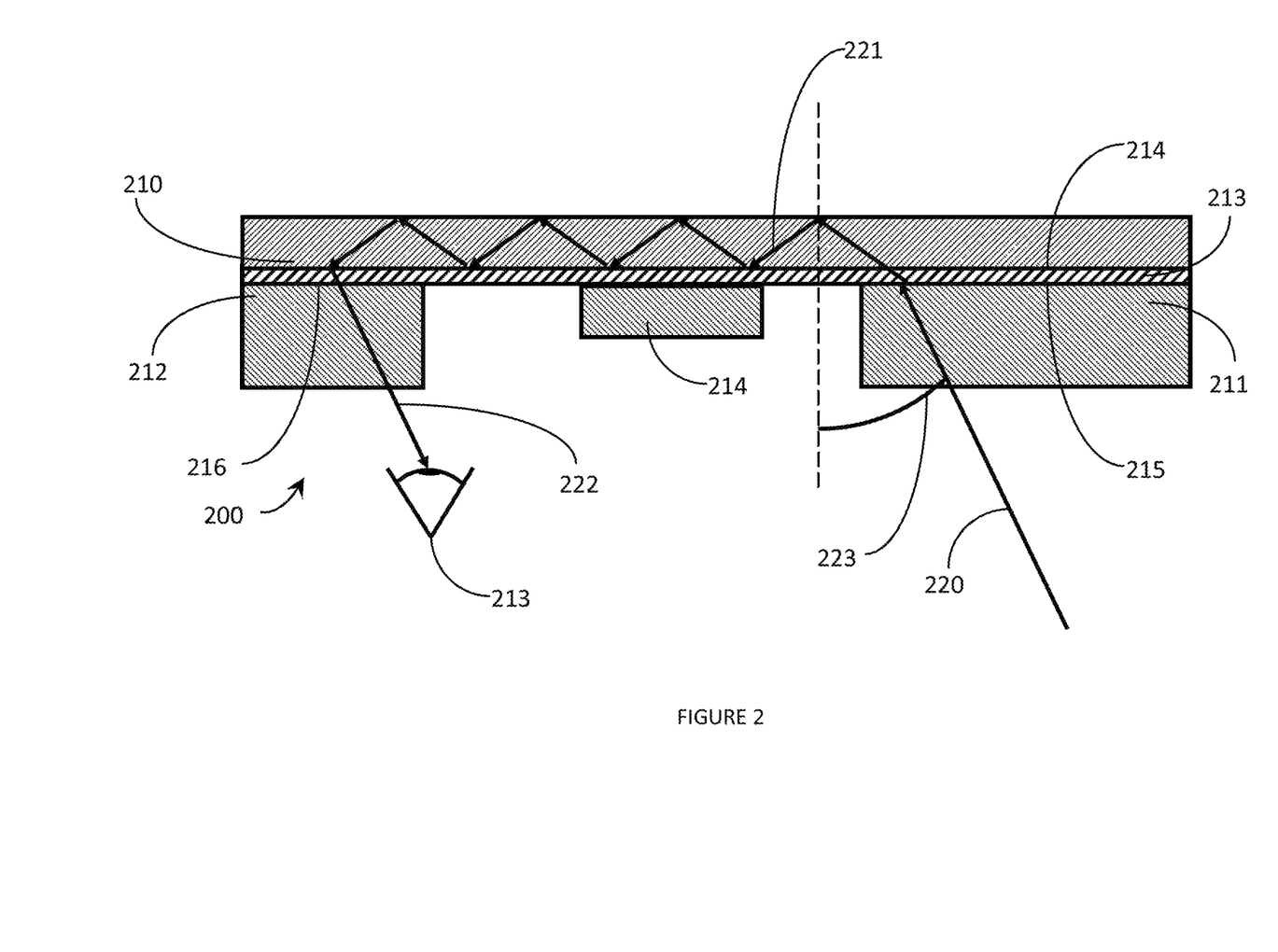
FIG. 2 is a cross-sectional view of light guide with expanded eyebox suitable for use in a WHUD in accordance with the present systems, devices, and methods.

FIG. 2 is a cross-sectional view of light guide with expanded eyebox 200 suitable for use in a WHUD in accordance with the present systems, devices, and methods. Light guide with expanded eyebox 200 comprises light guide 210, in-coupler 211, out-coupler 212, and gradient RI (GRIN) layer 213. GRIN layer 213 is physically coupled to light guide 210 at first surface 214. In-coupler 211 is physically coupled to GRIN layer 213 at second surface 215; in-coupler 211 is positioned and oriented to redirect light through GRIN layer 213 into light guide 210. Out-coupler 212 is physically coupled to GRIN layer 213 at third surface 216; out-coupler 212 is positioned and oriented to redirect light out of light guide 210 after said light has passed through GRIN layer 213. Light guide with expanded eyebox 200 may comprise exit pupil expander 214, exit pupil expander 214 is physically coupled to GRIN layer 213.

Beam of light 220 impinges on in-coupler 211 at incident angle 223 and is redirected through GRIN layer 213 into light guide 210 at an angle greater than the critical angle for light guide 210. Beam of light experiences TIR within light guide 210 and is converted to guided light 221. Guided light 221 propagates through light guide 210, bouncing off of the opposed surfaces of light guide 210. Upon reaching out-coupler 212, guided light 221 is redirected out of light guide 210 to form redirected light 222; redirected light 222 is directed towards an eye of a user 213.

GRIN layer 213 is located between in-coupler 211 and light guide 210. GRIN layer 213 may also be located between out-coupler 212 and light guide 210. GRIN layer 213 may be substantively similar to an anti-reflective coating (AR coat).

Light guide 210 may advantageously comprise a high index material, where a high index material is a material with a RI greater than 1.5. A high index material may have a RI of 1.7, 1.9, or 2.4, where a higher RI is advantageous as this allows TIR to occur at smaller angles of incidence within light guide 210. A higher RI material may require a more extreme gradient of RI within GRIN layer 213. Light guide 210 may comprise high-index glass.

Throughout this specification and the appended claims, the terms "in-coupler" and "out-coupler" are generally used to refer to any type of optical grating structure, including without limitation: diffraction gratings, holograms, holographic optical elements (e.g., optical elements employing one or more holograms), volume diffraction gratings, volume holograms, surface relief diffraction gratings, and/or surface relief holograms. Depending on the specific implementation (e.g., depending on the specific position of the in-coupler or out-coupler), the in-couplers/out-couplers herein may be of the transmission type (meaning they allow the display light to transmit therethrough and apply their designed optical function(s) to the light during such transmission) in which case they are referred to as "transmission in-/out-couplers," or they may be of the reflection type (meaning they reflect the display light and apply their designed optical function(s) to the light during such reflection) in which case they are referred to as "reflection in-/out-couplers." In the illustrated implementation of FIG. 2, in-coupler 211 is positioned between beam of light 220 and light guide 210, and out-coupler 212 is positioned between redirected light 222 and light guide 210, thus in-coupler 211 and out-coupler are both transmission gratings incident; however, in alternative implementations either or both of in-coupler 211 and/or out-coupler 212 may be a reflection grating positioned opposite light guide 210 relative to the position depicted in FIG. 2.

In the illustrated implementation of FIG. 2, in-coupler 211 and out-coupler 212 are shown as separate, discrete structures. In alternative implementations, in-coupler 211 and out-coupler 212 may be separate areas or regions of a single continuous structure. For example, in implementations in which in-coupler 211 and out-coupler 212 are both holographic optical elements, a single layer of photopolymer material may be carried by a surface of light guide 210 with at least one in-coupler hologram recorded in the layer of photopolymer material at the region or area corresponding to the position of in-coupler 211 and at least one out-coupler hologram recorded in the layer of photopolymer material at the region or area corresponding to the position of out-coupler 212.

In-coupler 211 may comprise a low RI material, where a low RI material is a material with a RI less than at least approximately 1.5. A low index material may be advantageous due to the ease of recording an incoupler and/or an outcoupler in said low index material, and/or due to an increase in quality (e.g. efficiency, transparency, bandwidth) of any incoupler/outcoupler recorded in said low index material, relative to a higher index material. Approximately as used herein means plus or minus 10% of the stated or nominal value unless expressly stated otherwise. Holograms, holographic optical elements, and volume holograms are typically recorded in photopolymer with a RI of approximately 1.5.

GRIN layer 213 comprises a first surface 214 and a second surface 215; GRIN layer 213 may comprise third surface 216. The RI of GRIN layer 213 at first surface 214 is equal to the RI of light guide 210. The RI of GRIN layer 213 at second surface 215 is equal to the RI of in-coupler 211. The refractive index between first surface 214 and second surface 215 forms a gradient, changing as a function of distance between first surface 214 and second surface 215. The gradient in refractive index between first surface 214 and second surface 215 ensures that there is no significant refractive index mismatch encountered by light that is redirected by in-coupler 211 through GRIN layer 213 into light guide 210; GRIN layer 213 therefore eliminates Fresnel reflections that would otherwise occur at an interface between in-coupler 211 and light guide 210 (as depicted in FIG. 1). There is typically a limit to how high the RI of in-coupler 211 may be, the physical and/or optical properties of higher RI materials are unsuitable for fabricating functioning in-coupler/out-couplers. GRIN layer 213 therefore allows high RI light guide materials to be employed with low index in-coupler/out-coupler without introducing optical defects due to Fresnel reflections.

If outcoupler 212 has a RI that is not equal to the RI of incoupler 211, then the RI of GRIN layer 213 at third surface 216 is equal to the RI of outcoupler 212. The refractive index between first surface 214 and third surface 216 forms a gradient, changing as a function of distance between first surface 214 and third surface 216.

Figure 3:
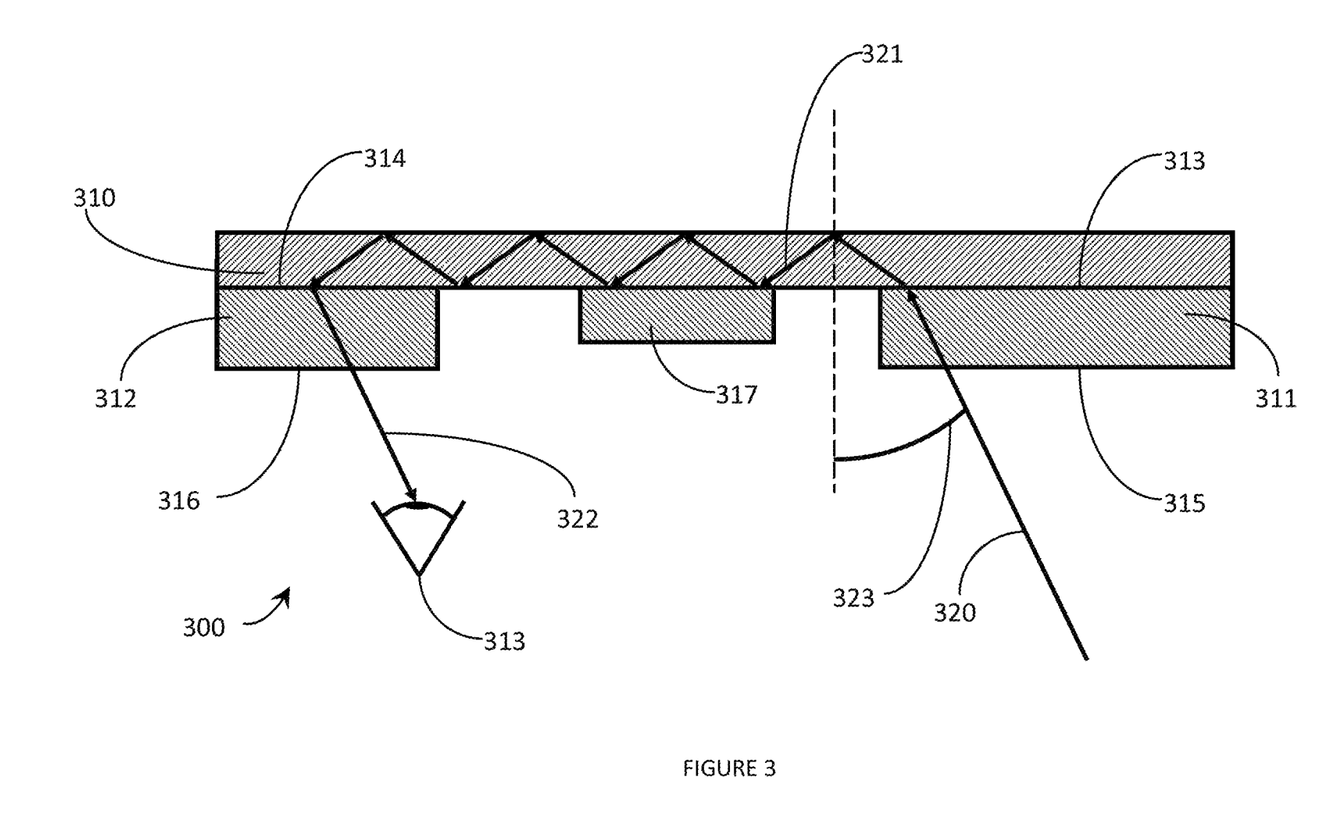
FIG. 3 is a cross-sectional view of light guide with expanded eyebox suitable for use in a WHUD in accordance with the present systems, devices, and methods.

FIG. 3 is a cross-sectional view of light guide with expanded eyebox 300 suitable for use in a WHUD in accordance with the present systems, devices, and methods. Light guide with expanded eyebox 300 comprises light guide 310, GRIN in-coupler 311, and GRIN out-coupler 312. GRIN in-coupler 311 comprises first surface 313 and third surface 315. GRIN in-coupler 311 is physically coupled to light guide 310 at first surface 313; GRIN in-coupler 311 is positioned and oriented to redirect light into light guide 310. GRIN out-coupler 312 comprises second surface 314 and fourth surface 316. GRIN out-coupler 312 is physically coupled to light guide 310 at second surface 314; GRIN out-coupler 312 is positioned and oriented to redirect light out of light guide 310. Light guide with expanded eyebox 300 may comprise GRIN exit pupil expander 317, GRIN exit pupil expander 317 may be physically coupled to light guide 310. Light guide 310 may be substantively similar to light guide 210. GRIN in-coupler 311 is similar in some ways to in-coupler 211. GRIN out-coupler 312 is similar in some ways to out-coupler 212.

Beam of light 320 impinges on GRIN in-coupler 311 with incident angle 323 and is redirected into light guide 310 at an angle greater than the critical angle for light guide 310. Beam of light 320 experiences TIR within light guide 310 and is converted to guided light 321. Guided light 321 propagates through light guide 310, bouncing off of the opposed surfaces of light guide 310. Upon reaching GRIN out-coupler 312, guided light 321 is redirected out of light guide 310 to form redirected light 322; redirected light 322 is directed towards an eye of a user 313.

Light guide 310 may advantageously comprise a high index material. GRIN in-coupler 311 comprises a material with a gradient refractive index. The RI of GRIN in-coupler 311 at first surface 313 is equal to the RI of light guide 310 while the RI of GRIN in-coupler 311 at third surface 315 is equal to the RI of a low-index material. The portion of GRIN in-coupler 311 nearest third surface 315 may form a higher quality in-coupler (higher efficiency, transparency, bandwidth, etc.) than the portion of GRIN in-coupler nearest first surface 313. Light guide with expanded eyebox 300 may be surrounded by a cladding layer comprising a low-index material; in this case the low-index RI of GRIN in-coupler 311 at third surface 315 prevents Fresnel reflections due to a RI mismatch between GRIN in-coupler 311 and said cladding.

GRIN out-coupler 312 may comprise a material with a gradient refractive index. The RI of GRIN out-coupler 312 at second surface 314 is equal to the RI of light guide 310 while the RI of GRIN out-coupler 312 at fourth surface 316 is equal to the RI of a low-index material.

Light guide with expanded eyebox 300 may further comprise GRIN exit pupil expander 317. GRIN exit pupil expander 317 replicates guided light 321 into additional exit pupils, typically in a direction orthogonal to the direction of propagation of guided light 321.

Figure 4:
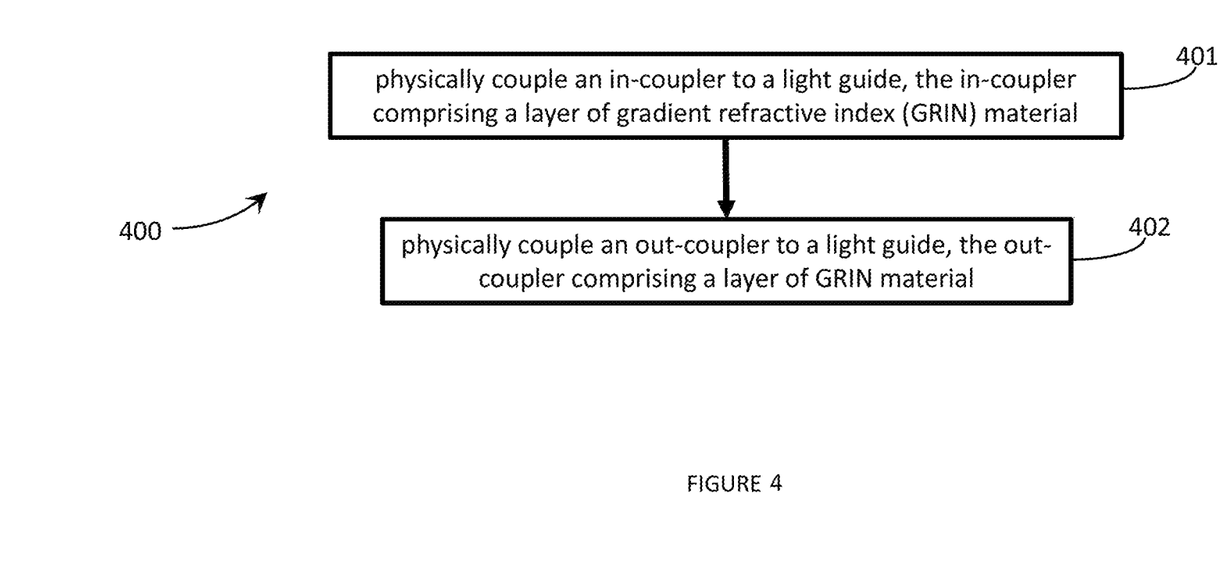
FIG. 4 is a flow-diagram showing a method of fabricating a light guide with an expanded eyebox in accordance with the present systems, devices, and methods.

FIG. 4 is a flow-diagram showing a method 400 of fabricating a light guide with an expanded eyebox in accordance with the present systems, devices, and methods. The light guide may be used in or incorporated into a wearable heads-up display. Method 400 includes two acts 401, and 402, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 400, analogous structures from FIG. 3 are called out in parentheses throughout the description of acts 401, and 402.

At 401, an in-coupler (311) is physically coupled to a light guide (310), the in-coupler comprising a gradient refractive index (GRIN) material. The in-coupler may comprise an organic GRIN layer.

At 402, an out-coupler (312) is physically coupled to a light guide (310), the out-coupler comprising a GRIN material. The out-coupler may comprise an organic GRIN layer.

Method 400 may further comprise physically coupling an exit pupil expander (317) to the light guide (310). The exit pupil expander may comprise an organic GRIN layer.

An organic GRIN coupler is an in-coupler, an out-coupler, or an exit pupil expander comprised of organic material; typical organic material includes polymers. A typical organic GRIN coupler may advantageously comprise photopolymer, since photopolymer may be employed to fabricate high-quality couplers.

An organic GRIN coupler (311, 312) may be fabricated via partial polymerization of a high index monomer, followed by deposition and mixing of a low-index recording medium to form a composite material. The partial polymerization of the high index monomer forms a gradient of high index polymer within the composite material, causing the refractive index of the composite material to vary as a function of the degree of polymerization of the high index monomer within the composite material.

An organic GRIN coupler (311, 312) may therefore be fabricated by first depositing a layer of high index monomer, partially polymerizing the high index monomer, washing away the unreacted high index monomer, depositing a layer of photopolymer onto the layer of partially polymerized high index monomer, and recording a coupler into the deposited layer of photopolymer. The gradient of the amount of polymerized high index monomer in the photopolymer/high index monomer composite material forms a gradient refractive index within said composite material. A person of skill in the art will appreciate that a low index monomer may also be employed to create a gradient refractive index, with the major difference being that a higher degree of polymerization would then correspond to a lower refractive index.

Partial polymerization may be performed as a function of depth within the coupler, with a greater degree of polymerization as the distance from one surface of the coupler increases. Partial polymerization may include photopolymerization, in which case a gradient of the intensity of light may be used to create a gradient of degree of polymerization.

Alternatively, an organic GRIN coupler (311, 312) may be fabricated by incorporating inorganic high-index nanostructures into a photopolymer material. High-index nanostructures have a size significantly smaller than the wavelength of visible light, therefore high-index nano-structures do not scatter visible light, visible light instead only interacts with high-index nano-structures via the average RI of the material containing the high-index nano-structures. The average RI of the material is a combination of the volume fraction of the high-index nano-structures and their RI with the volume fraction of the photopolymer and the RI of the photopolymer. A gradient of high-index nano-structures may therefore create a gradient of the average RI, and therefore the actual RI of the material.

The inorganic high-index structures may be nano-structured cones oriented to align said cones between the major surfaces of the organic GRIN coupler (311, 312). The decreasing cross-section of the nano-structured cones as a function of depth within the photopolymer creates a gradient of RI within the photopolymer. Alternatively, nanoparticles (non-exclusive examples of nanoparticles include: nanospheres, nano-rods, and/or nano-wires) may be mixed into the photopolymer with a gradient (concentration of particles, size of particles, volume fraction of particles, etc.) to form a gradient of RI.

Figure 5:
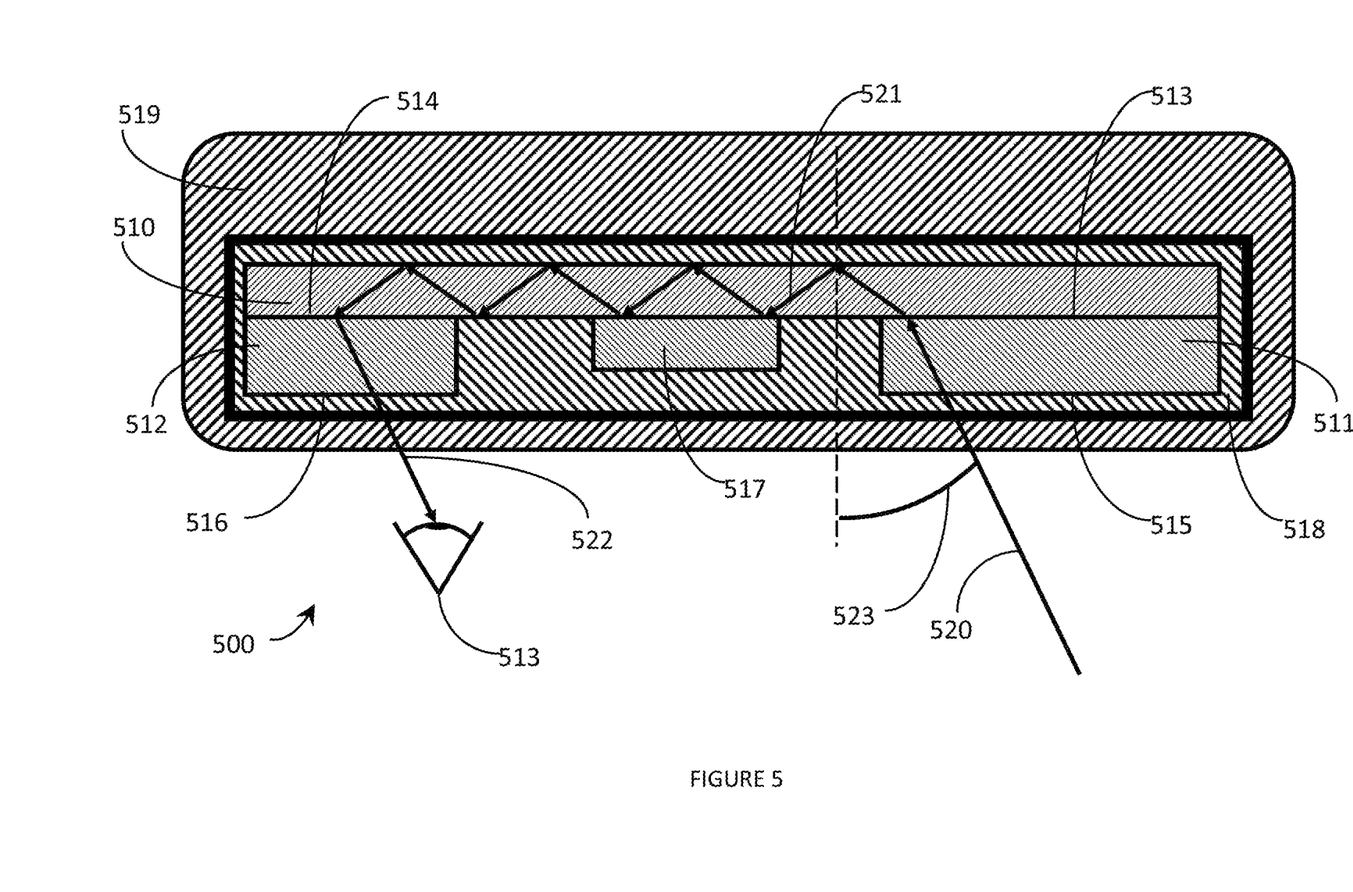
FIG. 5 is a cross-sectional view of an exemplary eyeglass lens with comprising a light guide with an expanded eyebox in accordance with the present systems, devices, and methods.

FIG. 5 is a cross-sectional view of an exemplary eyeglass lens 500 with comprising a light guide with an expanded eyebox in accordance with the present systems, devices, and methods. Eyeglass lens 500 comprises light guide 510, GRIN in-coupler 511, GRIN out-coupler 512, cladding layer 518 and lens layer 519. Light guide 510 is integrated with eyeglass lens 500. In the illustrated implementation, light guide 510 is integrated inside eyeglass lens 500.

Cladding layer 518 surrounds light guide 510, GRIN in-coupler 511, and GRIN-outcoupler 512. Cladding layer 518 comprises a low index material, where cladding layer may comprise a material with a refractive index of 1.5, 1.2, or 1.0. A lower refractive index is more advantageous as this increases the field of view of the light guide when the light guide is used as a display. A non-exclusive example of a cladding material with a refractive index of 1.5 is a plastic material (PET, acrylic, Nylon, etc.). A non-exclusive example of a cladding material with a refractive index of 1.2 is a layer of silica sol-gel. A non-exclusive example of a cladding material with a refractive index of 1.0 is air, where a cladding layer comprising air typically includes additional material to provide structural support to the light guide.

GRIN in-coupler 511 comprises first surface 513 and third surface 515. GRIN in-coupler 511 is physically coupled to light guide 510 at first surface 513; GRIN in-coupler 511 is positioned and oriented to redirect light into light guide 510. GRIN out-coupler 512 comprises second surface 514 and fourth surface 516. GRIN out-coupler 512 is physically coupled to light guide 510 at second surface 514; GRIN out-coupler 512 is positioned and oriented to redirect light out of light guide 510. Light guide 510, in-coupler 511, and out-coupler 512 may be substantively similar to light guide 510, in-coupler 511, and out-coupler 512, respectively.

Beam of light 520 impinges on in-coupler 511 with incident angle 523 and travels into, through, and out of light guide 510 and outcoupler 512 in a manner substantively similar to the passage of light though light guide 300.

Eyeglass lens 500 may further comprise GRIN exit pupil expander 517; GRIN exit pupil expander 517 may be physically coupled to light guide 510.

Light guide 510 may advantageously comprise a high index material. GRIN in-coupler 511 comprises a material with a gradient refractive index. The RI of GRIN in-coupler 511 at first surface 513 is equal to the RI of light guide 510 while the RI of GRIN in-coupler 511 at third surface 515 is equal to the RI of a low-index material. The portion of GRIN in-coupler 511 nearest third surface 515 may form a higher quality in-coupler (higher efficiency, transparency, bandwidth, etc.) than the portion of GRIN in-coupler nearest first surface 513. The low-index RI of GRIN in-coupler 511 at third surface 515 prevents Fresnel reflections due to a RI mismatch between GRIN in-coupler 511 and cladding layer 518.

GRIN out-coupler 512 may comprise a material with a gradient refractive index. The RI of GRIN out-coupler 512 at second surface 514 is equal to the RI of light guide 510 while the RI of GRIN out-coupler 512 at fourth surface 516 is equal to the RI of a low-index material.

Figure 6:
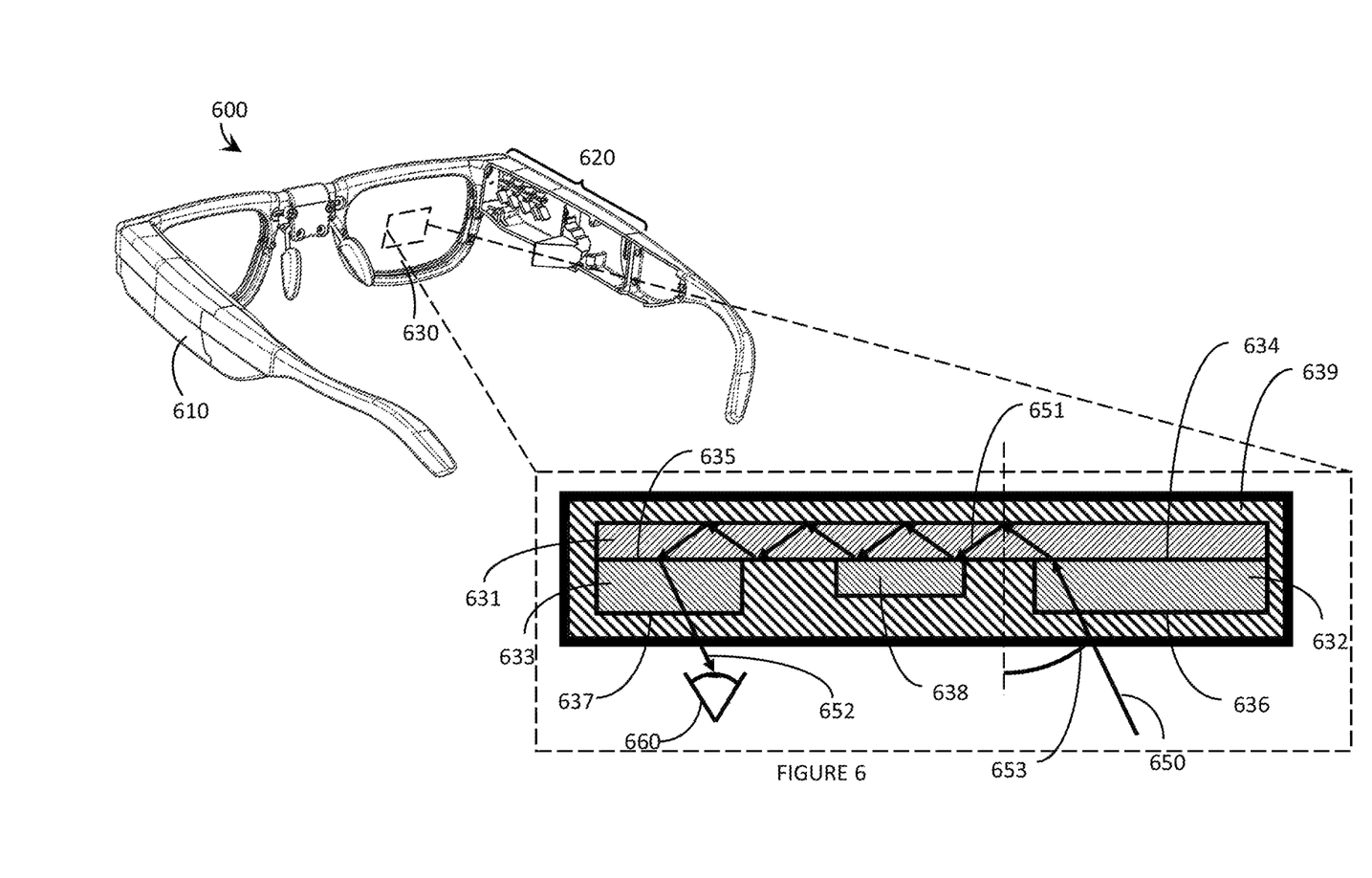
FIG. 6 is a partial-cutaway perspective view of a wearable heads-up display that includes an eyeglass lens with an embedded light guide, the light guide having an expanded eyebox, in accordance with the present systems, devices, and methods.

FIG. 6 is a partial-cutaway perspective view of a wearable heads-up display (WHUD) 600 that includes an eyeglass lens 630 with an embedded light guide, the light guide having an expanded eyebox, in accordance with the present systems, devices, and methods. Eyeglass lens 630 may be substantially similar to eyeglass lens 500 from FIG. 5. WHUD 600 comprises a support structure 610 that is worn on the head of the user and has a general shape and appearance of an eyeglasses (e.g., sunglasses) frame. Support structure 610 carries multiple components, including: a light engine 620, and an eyeglass lens 630. In the illustrated example of WHUD 600, light engine 620 comprises a projector (e.g., a scanning laser projector), though in alternative implementations light engine 620 may include a non-laser-based projector (e.g., LED-based, microLED-based, or OLED-based) or a non-projector-based light engine, such as a microdisplay. Projector 620 is positioned and oriented to direct light towards the eyeglass lens and may include, for example, a micro-display system, a scanning laser projection system, a scanning LED projection system, a digital light processing projector, or a spatial light modulation projector. FIG. 6 provides a partial-cutaway view in which regions of support structure 610 have been removed in order to render visible portions of projector 620 and clarify the location of projector 620 within WHUD 600. Eyeglass lens 630 is positioned within a field of view of an eye of the user when the support structure is worn on the head of the user and serves as both a conventional eyeglass lens (i.e., prescription or non-prescription depending on the needs of the user) and a transparent combiner.

FIG. 6 includes a detailed top-down view of eyeglass lens 630. Eyeglass lens 630 comprises light guide 631, GRIN in-coupler 632, GRIN out-coupler 633, and cladding layer 639; eyeglass lens 630 comprises lens material that has been omitted from the top down view for clarity.

Cladding layer 639 surrounds light guide 631, GRIN in-coupler 632, and GRIN-outcoupler 633. Cladding layer 639 comprises a low index material, where cladding layer may comprise a material with a refractive index of 1.5, 1.2, or 1.0. A lower refractive index is more advantageous as this increases the field of view of the light guide when the light guide is used as a display. A non-exclusive example of a cladding material with a refractive index of 1.5 is a plastic material (PET, acrylic, Nylon, etc.). A non-exclusive example of a cladding material with a refractive index of 1.2 is a layer of silica sol-gel. A non-exclusive example of a cladding material with a refractive index of 1.0 is air, where a cladding layer comprising air typically includes additional material to provide structural support to the light guide.

GRIN in-coupler 632 comprises first surface 513 and third surface 515. GRIN in-coupler 632 is physically coupled to light guide 631 at first surface 513; GRIN in-coupler 632 is positioned and oriented to redirect light into light guide 631. GRIN out-coupler 633 comprises second surface 514 and fourth surface 516. GRIN out-coupler 633 is physically coupled to light guide 631 at second surface 514; GRIN out-coupler 633 is positioned and oriented to redirect light out of light guide 631. Light guide 631, in-coupler 632, and out-coupler 633 may be substantively similar to light guide 631, in-coupler 632, and out-coupler 633, respectively.

Projector 620 produces beam of light 650 and directs beam of light 650 towards incoupler 632. Beam of light 650 impinges on in-coupler 632 with incident angle 653 and is redirected into light guide 631 at an angle greater than the critical angle for light guide 631. Beam of light 650 experiences TIR within light guide 631 and is converted to guided light 651. Guided light 651 propagates through light guide 631, bouncing off of the opposed surfaces of light guide 631. Upon reaching GRIN out-coupler 633, guided light 651 is redirected out of light guide 631 to form redirected light 652; redirected light 652 is directed towards an eye of a user 660.

In use, light from projector 620 is directed into light guide 631, and then said light is redirected out of light guide 631 towards the eye of the user. To enter the eye of the user and thereby be visible to the eye of the user, the light must pass through the pupil of the eye of the user. The pupil of the eye of the user is small and moves depending on the direction in which the user is looking. Light may be redirected from light guide 631 across a range of angles to ensure that light may enter the eye of the user when the pupil of the eye of the user may be located across a range of positions. The range of angles across which light may be redirected from light guide 631 is the field of view (FOV) of WHUD 600.

The FOV of WHUD 600 depends on the range of angles at which light may be guided in to light guide 631, since in a typical WHUD the range of input angles of the in-coupler is equal to the range of output angles of the out-coupler. The range of angles at which light may be guided in to light guide 631 is defined by a minimum input angle and a maximum input angle.

The maximum input angle of light guide 631 depends on the bounce length of light within light guide 631 and the size of the pupil of the user. The maximum input angle of light guide 631 therefore is not easy to increase, and an increase in FOV (and consequent increase in eyebox) of WHUD 600 cannot be reasonably effected by increasing the maximum input angle.

The minimum input angle of light guide 631 depends on the difference in refractive index (RI) between light guide 631 and cladding layer 639. The higher the RI of light guide 631, and/or the lower the RI of cladding layer 639, the lower the minimum input angle of light guide 631 and the greater the FOV of light guide 631. Therefore, the eyebox of a WHUD may be expanded by increasing the difference in RI between light guide 631 and cladding layer 639. The difference in RI may be maximized by using a high-index material for light guide 631. A person of skill in the art will appreciate that in some implementations, cladding layer 639 may be omitted and eyebox expansion may be effected via the difference in refractive index between light guide 631 and the material comprising lens 630.

While a using a high index material for light guide 631 expands the eyebox of WHUD 600, a mismatch in RI between couplers (in-coupler, outcoupler, exit pupil expander) causes optical aberrations when light passes between said couplers and light guide 631. It is therefore advantageous for the RI of GRIN in-coupler 632, GRIN out-coupler 633, and/or GRIN exit pupil expander 638 to be equal to the refractive index of light guide 631 at the interface between each of said couplers and light guide 631. It is also advantageous for the RI of GRIN in-coupler 632, GRIN out-coupler 633, and/or GRIN exit pupil expander 638 to be equal to the refractive index of cladding layer 639 at the interface between each of said couplers and cladding layer 639, and for the RI of each coupler to vary between the two interfaces. Each of: GRIN in-coupler 632, GRIN out-coupler 633, and/or GRIN exit pupil expander 638 may be fabricated according to the methods described above.

Eyeglass lens 630 may further comprise GRIN exit pupil expander 638; GRIN exit pupil expander 638 may be physically coupled to light guide 631. GRIN exit pupil expander 638 may be substantively similar to GRIN exit pupil expander 317.

Light guide 631 may advantageously comprise a high index material. GRIN in-coupler 632 comprises a material with a gradient refractive index. The RI of GRIN in-coupler 632 at first surface 513 is equal to the RI of light guide 631 while the RI of GRIN in-coupler 632 at third surface 515 is equal to the RI of a low-index material. The portion of GRIN in-coupler 632 nearest third surface 515 may form a higher quality in-coupler (higher efficiency, transparency, bandwidth, etc.) than the portion of GRIN in-coupler nearest first surface 513. The low-index RI of GRIN in-coupler 632 at third surface 515 prevents Fresnel reflections due to a RI mismatch between GRIN in-coupler 632 and cladding layer 639.

GRIN out-coupler 633 may comprise a material with a gradient refractive index. The RI of GRIN out-coupler 633 at second surface 514 is equal to the RI of light guide 631 while the RI of GRIN out-coupler 633 at fourth surface 516 is equal to the RI of a low-index material.

Advantageously, WHUD 600 may, in use, direct light from projector 620, through lens 630, and into the eye of the user via a high-index light guide without encountering a RI mis-match causing optical aberrations.

Each of GRIN in-coupler 632, GRIN out-coupler 633, and/or GRIN exit pupil expander 638 may comprise a hologram. Each of GRIN in-coupler 632, GRIN out-coupler 633, and/or GRIN exit pupil expander 638 may be a part of a single piece of photopolymer. Each of GRIN in-coupler 632, GRIN out-coupler 633, and/or GRIN exit pupil expander 638 may have a thickness less than 10 microns, or less than 6 microns, where a thinner coupler ensures that light travels primarily through light guide material and not coupler material, as light guide material typically has higher transparency. Each of GRIN in-coupler 632, GRIN out-coupler 633, and/or GRIN exit pupil expander 638 may comprise a wavelength-multiplexed hologram, where wavelength-multiplexed holograms allow for full color (red/green/blue, i.e., RGB) display. Each of GRIN in-coupler 632, GRIN out-coupler 633, and/or GRIN exit pupil expander 638 may perform dispersion accommodation, where dispersion accommodation includes reducing any net chromatic aberration within the light guide to approximately zero. Dispersion accommodation may be effected by ensuring that the chromatic aberration of GRIN in-coupler 632 is equal in magnitude and opposite in sign to the chromatic aberration of GRIN outcoupler 633, which may be achieved by using substantively similar dispersive elements (e.g., holgorams) for GRIN in-coupler 632 and GRIN out-coupler 633.

A non-exclusive example of eyebox expansion by using high index materials for a light guide is using a light guide material with a RI of 1.7 surrounded by a cladding layer with a RI of 1.2 to give a FOV of 10 degrees, rather than using a light guide material with a RI of 1.5 surrounded by a cladding layer with a RI of 1.2 to give a FOV of 8 degrees. Another non-exclusive example of eyebox expansion by using high index materials for a light guide is using a light guide material with a RI of 1.7 surrounded by a cladding layer with a RI of 1.0 to give a FOV of 25 degrees, rather than using a light guide material with a RI of 1.5 surrounded by a cladding layer with a RI of 1.0 to give a FOV of 20 degrees.

Figure 7:
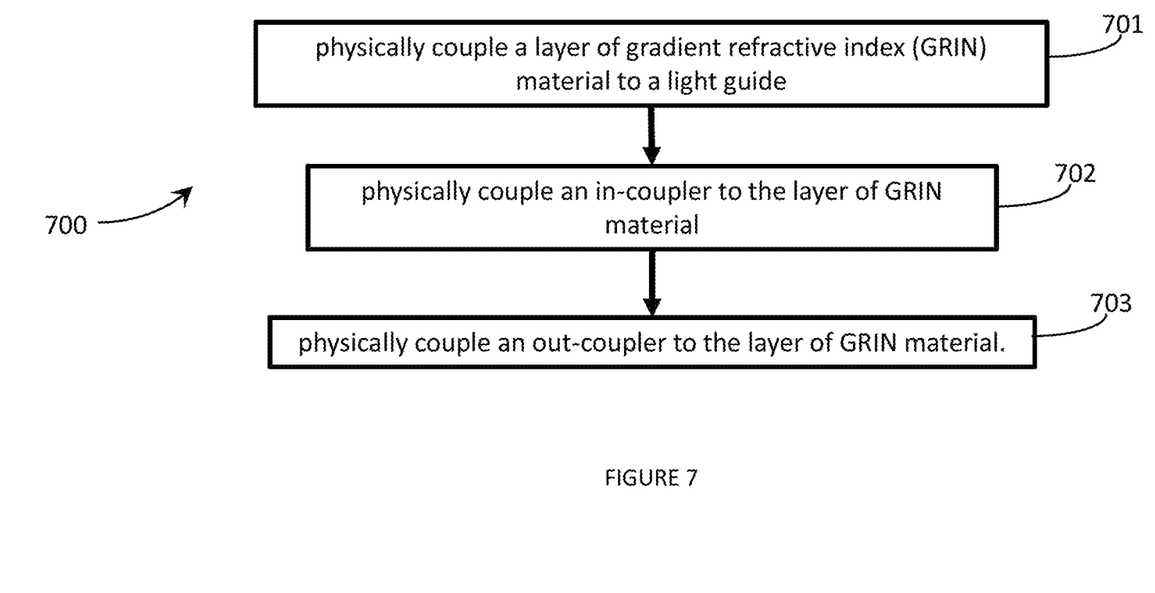
FIG. 7 is a flow-diagram showing a method of fabricating a light guide with an expanded eyebox in accordance with the present systems, devices, and methods.

FIG. 7 is a flow-diagram showing a method 700 of fabricating a light guide with an expanded eyebox in accordance with the present systems, devices, and methods. The light guide may be used in or incorporated into a wearable heads-up display. Method 700 includes three acts 401, 402, and 403, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 700, analogous structures from FIG. 2 are called out in parentheses throughout the description of acts 401, and 402.

At 701, a layer of GRIN material (213) is physically coupled to a light guide (210). The layer of GRIN material may comprises an inorganic GRIN material.

At 702, an in-coupler (211) is physically coupled to the layer of GRIN material (213).

At 703, an out-coupler (212) is physically coupled to the layer of GRIN material (213).

Method 700 may further comprise physically coupling an exit pupil expander (214) to the layer of GRIN material (213).

An inorganic GRIN layer (213) may be fabricated by vapor deposition of material of varying refractive index onto a light guide (210). Alternatively, An inorganic GRIN layer (213) may be fabricated by neutron-irradiation of a layer of boron rich glass and/or ion exchange in a layer of glass.

A person of skill in the art will appreciate that the various embodiments for embedding a diffractive element in an eyeglass lens described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, US Patent Application Publication No. US 2014-0198034 A1, US Patent Application Publication No. US 2014-0198035 A1, US Patent Application Publication No. US 2015-0370326 A1, and/or US Patent Application Publication No. US 2017-0097753 A1, all of which are incorporated by reference herein in their entirety.

Throughout this specification and the appended claims, the terms "carries" and "carried by" are generally used to describe a spatial relationship in which a first layer/component is positioned proximate and physically coupled to a surface of a second layer/component, either directly or through one or more intervening layers/components. The terms "carries" and "carried by" are not intended to denote a particular orientation with respect to top and bottom and/or left and right.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, US Patent Application Publication No. US 2016-0238845 A1, US Patent Application Publication No. 2017-0068095, US Provisional Patent Application Ser. No. 62/534,099, US Provisional Patent Application Ser. No. 62/565,677, US Provisional Patent Application Ser. No. 62/525,601, US Provisional Patent Application Ser. No. 62/557,551, US Provisional Patent Application Ser. No. 62/557,554, and US Provisional Patent Application Ser. No. 62/573,978, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A light guide comprising:
a light guide material;
a gradient refractive index (GRIN) material carried by the light guide material;
an in-coupler;
an out-coupler; and
an exit pupil expander hologram disposed between the in-coupler and the out-coupler,
wherein the exit pupil expander hologram is recorded in the GRIN material.

2. The light guide of claim 1 wherein a first portion of the GRIN material is disposed between the in-coupler and the light guide material and a second portion of the GRIN material is disposed between the out-coupler and the light guide material.

3. The light guide of claim 2 wherein the GRIN material comprises a single continuous layer of GRIN material carried by a surface of the light guide material.

4. The light guide of claim 1 wherein the in-coupler comprises an in-coupler hologram and the out-coupler comprises an out-coupler hologram.

5. The light guide of claim 1 wherein the in-coupler comprises an in-coupler surface relief grating and the out-coupler comprises an out-coupler surface relief grating.

6. The light guide of claim 1 wherein the GRIN material comprises a GRIN photopolymer material.

7. The light guide of claim 6 wherein the in-coupler comprises an in-coupler hologram recorded in a first portion of the GRIN material and the out-coupler comprises an out-coupler hologram recorded in a second portion of the GRIN material.

8. The light guide of claim 7, wherein the exit pupil expander hologram is recorded in a third portion of the GRIN material, the third portion of the GRIN material positioned in between the first portion of the GRIN material and the second portion of the GRIN material on a surface of the light guide material.

9. A lens for use in a wearable heads-up display, the lens comprising: a lens material; and a light guide integrated with the lens material, the light guide comprising: a light guide material; a gradient refractive index (GRIN) material carried by the light guide material; an in-coupler; an out-coupler; and an exit pupil expander hologram disposed between the in-coupler and the out-coupler, wherein the exit pupil expander hologram is recorded in the GRIN material.

10. The lens of claim 9 wherein the light guide is integrated inside the lens material.

11. The lens of claim 9 wherein a first portion of the GRIN material is disposed between the in-coupler and the light guide material and a second portion of the GRIN material is disposed between the out-coupler and the light guide material.

12. The lens of claim 11 wherein the GRIN material comprises a single continuous layer of GRIN material carried by a surface of the light guide material.

13. The lens of claim 11, wherein the GRIN material comprises a GRIN photopolymer material, the in-coupler comprises an in-coupler hologram recorded in a first portion of the GRIN material, and the out-coupler comprises an out-coupler hologram recorded in a second portion of the GRIN material.

14. The lens of claim 13, wherein the exit pupil expander hologram is recorded in a third portion of the GRIN material, the third portion of the GRIN material positioned in between the first portion of the GRIN material and the second portion of the GRIN material on a surface of the light guide material.

15. A wearable heads-up display (WHUD) comprising: a support structure; a light engine carried by the support structure; and a transparent combiner positioned and oriented to appear in a field of view of an eye of a user when the support structure is worn on a head of the user, the transparent combiner comprising: a lens; and a light guide integrated with the lens, the light guide comprising: a light guide material; a gradient refractive index (GRIN) material carried by the light guide material; an in-coupler; an out-coupler; and an exit pupil expander hologram disposed between the in-coupler and the out-coupler, wherein the exit pupil expander hologram is recorded in the GRIN material.

16. The WHUD of claim 15 wherein a first portion of the GRIN material is disposed between the in-coupler and the light guide material and a second portion of the GRIN material is disposed between the out-coupler and the light guide material.

17. The WHUD of claim 16 wherein the GRIN material comprises a single continuous layer of GRIN material carried by a surface of the light guide material.

18. The WHUD of claim 15 wherein the GRIN material comprises a GRIN photopolymer material, the in-coupler comprises an in-coupler hologram recorded in a first portion of the GRIN material, and the out-coupler comprises an out-coupler hologram recorded in a second portion of the GRIN material.

19. The WHUD of claim 18, wherein the exit pupil expander hologram is recorded in a third portion of the GRIN material, the third portion of the GRIN material positioned in between the first portion of the GRIN material and the second portion of the GRIN material on a surface of the light guide material.

* * * * *